Dec. 6, 1955

F. H. DU HEAUME 2,726,076

MEANS FOR MEASURING THE WEIGHT FLOW OF
MATERIALS IN SPOUTS OR DUCTS

Filed Dec. 30, 1952

Inventor
F. H. de Heaume
By Jewel Downing Duffield
Attys.

Dec. 6, 1955     F. H. DU HEAUME     2,726,076
MEANS FOR MEASURING THE WEIGHT FLOW OF
MATERIALS IN SPOUTS OR DUCTS

Filed Dec. 30, 1952     3 Sheets-Sheet 2

Inventor
F. H. de Heaume
By Clarent Downing Diebold
Attys

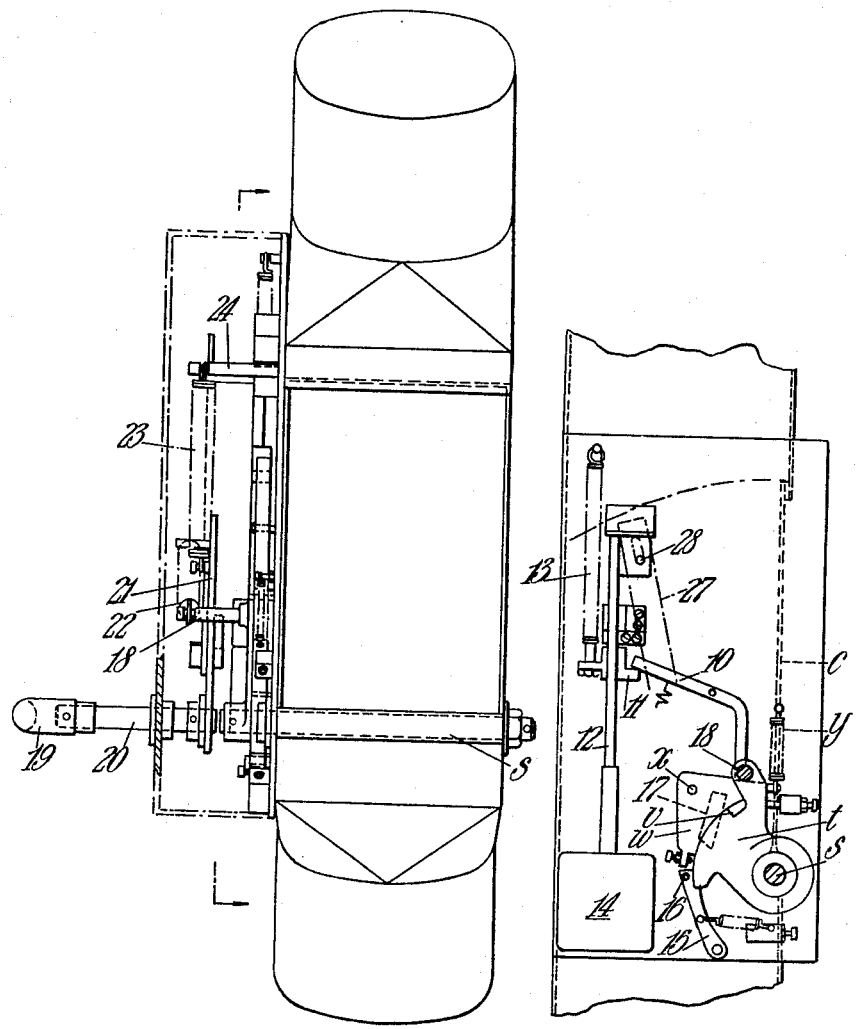

United States Patent Office 2,726,076
Patented Dec. 6, 1955

2,726,076

MEANS FOR MEASURING THE WEIGHT FLOW OF MATERIALS IN SPOUTS OR DUCTS

Francis Herbert du Heaume, Cheadle Heath, Stockport, England, assignor to Henry Simon Limited, Cheadle Heath, Stockport, England, a British company Application December 30, 1952, Serial No. 328,623

Claims priority, application Great Britain January 7, 1952

2 Claims. (Cl. 265—27)

This invention has for its object to provide an improved meter for measuring the weight flow of free flowing granular materials, such as cereal products, flowing down a spout or duct (hereinafter termed spout), in predetermined intervals of time.

The invention consists in a meter for measuring the weight flow of free flowing materials travelling down a spout comprising a by-pass fitting arranged in the spout with a valve which can divert the material passing down the spout and cause it to flow into the by-pass where it is received by a scale pan or its equivalent associated with a weight indicator and/or recorder, with means causing the valve to divert the material for a predetermined interval of time after which the valve is automatically reurned to its normal position allowing the usual flow down the spout.

The invention further consists in a meter as aforesaid in which a handle operates mechanism to load a spring which moves the valve to its material diverting position when a catch operated by said mechanism is released, the mechanism returning the valve to its normal position when an escapement controlled part has made a predetermined length of movement and released a catch.

The invention further consists in a meter as aforesaid in which the handle when turned in a direction to commence a weighing cycle turns an arm connected by a spring to a cam plate on the valve spindle, the said arm also tensioning a re-setting spring and moving a rod to tension a calibrated spring, the movement of the rod by said spring being regulated by escapement mechanism, the said arm also when approaching its final position as moved by said handle releasing a catch preventing the cam plate opening the valve and releasing the part which moved the rod to compress the calibrated spring so that such rod can be moved by the calibrated spring until it actuates a catch (which automatically holds the cam plate in the valve open position) and releases the cam plate which is returned by the pressure of the re-setting spring acting on the arm and so on a part of the cam plate, to the valve closed position.

The invention further consists in a meter as aforesaid in which the by-pass contains a weighpan or bucket which is spring supported and operates in its movements a weight indicator, the bottom of the bucket being pivotally carried on the pan or bucket so that it can be opened by hand operation to discharge the contents of the pan or bucket after a weighment has been effected.

The invention further consists in a meter as aforesaid in which the material diverted into the by-pass returns to the spout at a lower level after weighment.

The invention further consists in a meter as aforesaid in which the by-pass has curved telescoping parts to enable the weighing apparatus to be put into a vertical position.

Referring to the accompanying explanatory drawings:

Figure 3 is a view of the weighing and discharge mechanism taken at right angles to Figure 2.

Figure 4 shows the parts on the valve spindle which are actuated from the parts shown in Figure 2, also the timing mechanism for controlling the period of time during which the valve diverts the flow of material into the by-pass and weighing mechanism. The parts are shown in the valve open or material diverting position.

Figure 5 is a view similar to Figure 4 but showing the parts in the positions they occupy when the valve is in its normal position.

Figure 6 is a view of the operative mechanism controlling the valve taken at right angles to Figure 2.

Figure 1:
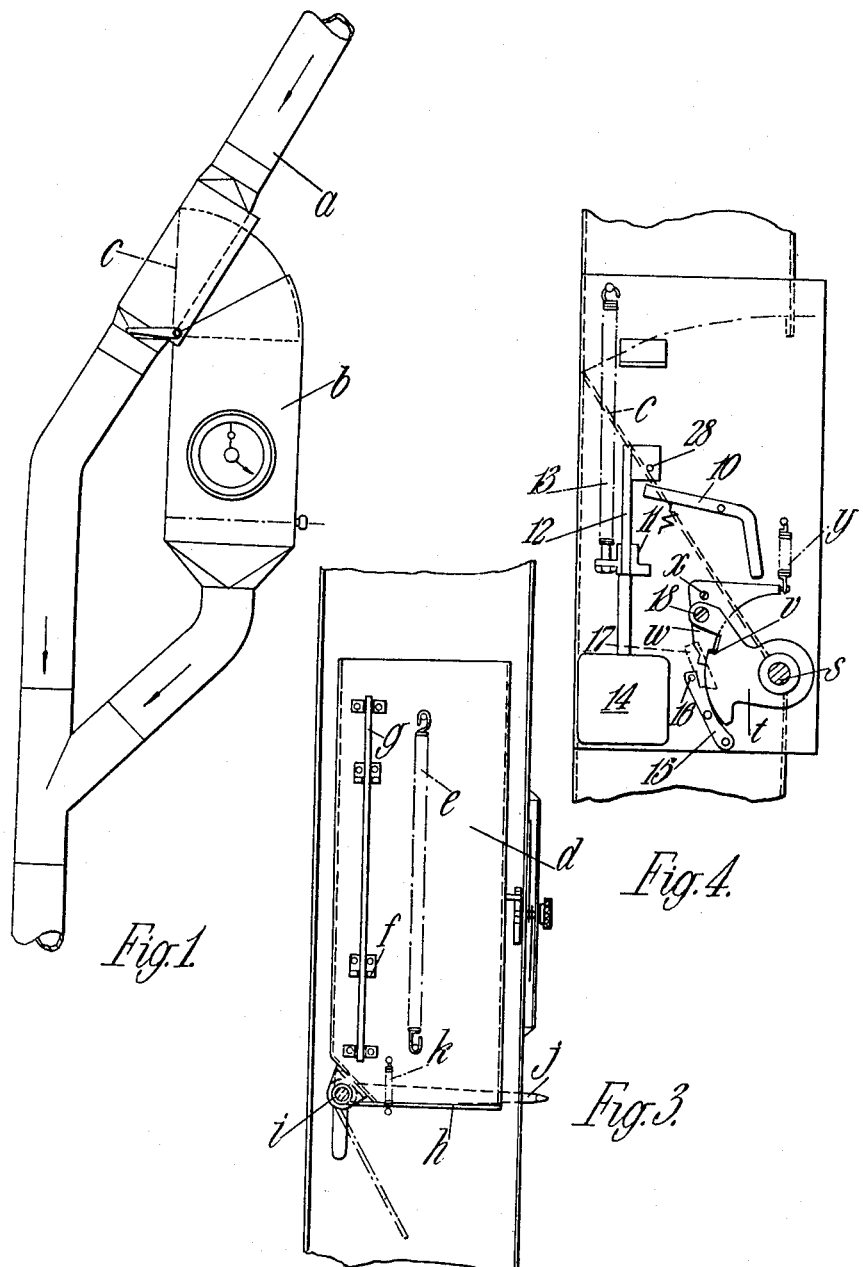
Figure 1 is a diagrammatic view of a weight flow metering arrangement in one convenient form in accordance with this invention.

In Figure 1, the spout $a$ down which the material is flowing has a by-pass or branch connection $b$ in which is a weighing appliance and there is a valve $c$ which normally lies in a position to prevent material entering the by-pass but which can be moved into the chain dotted line position in Figure 1, when it causes the whole of the material passing down the spout $a$ to pass into the scale pan or its equivalent in the by-pass $b$. The valve $c$ diverts the material to the by-pass for a predetermined interval of time and then returns automatically to its normal position cutting off the by-pass. As the arrangement measures the total weight flow down the spout during a short period of time, the weight flow for any other period can be readily calculated. After the weighment has been made, the by-passed material can be returned to the main spout at a lower point as shown in Figure 1, or can be delivered elsewhere if desired.

The by-pass $b$ contains, in the illustrated example, a weighbucket $d$ (see Figures 2 and 3) supported by calibrated springs $e$ at its opposite sides and guided to move in a vertical direction by brackets $f$ on the weighbucket engaging guide rods $g$ on the by-pass casing. The bottom $h$ of the weighbucket is pivotally attached at $i$ to the rear wall of the bucket and can be opened against the pressure of the springs $k$ by turning a handle $j$ in order to discharge the contents of the bucket, the springs $k$ closing the bottom after discharge has been effected when the handle $j$ is released.

A pin $m$ on the bucket $d$ engages the slotted part $n$ of a quadrant-rack which turns a pinion $o$ carrying a pointer $p$ moving over a dial $q$ on the outside of the by-pass casing, so that the extent of the depression of the weighbucket by the material therein is indicated by the pointer $p$. Another pointer $r$ can be pre-set to show the expected weight of each weighment and so give an instantaneous check on the flow rate as given by the actual weighments.

The valve plate $c$ is mounted upon a spindle $s$ (see Figures 4, 5 and 6) to which is secured a cam plate $t$ having a depression in its edge which provides a shoulder $v$ adapted to be engaged in one position of the cam plate by a latch $w$ pivotally mounted at $x$ and loaded by a spring $y$ (see Figure 4). When the latch is engaging the shoulder $v$, it can be released by a lever 10, when this lever is turned from its Figure 4 to its Figure 5 position by a collar 11 on a rod 12, the rate of movement of which under the pull of the spring 13 is controlled by an ordinary escapement mechanism such as is common in clocks and which is indicated at 14. When the cam plate $t$ is in the Figure 5 position, it is held there by a spring loaded catch 15 which has a peg or pin 16 projecting from one side thereof which is engaged by a part 17 to be hereinafter described in order to release the cam plate and allow the valve $c$ to move to the Figure 4 position under the pull of a spring to be hereinafter referred to which is attached at one end to the pin 18 on the cam plate.

Figure 2:
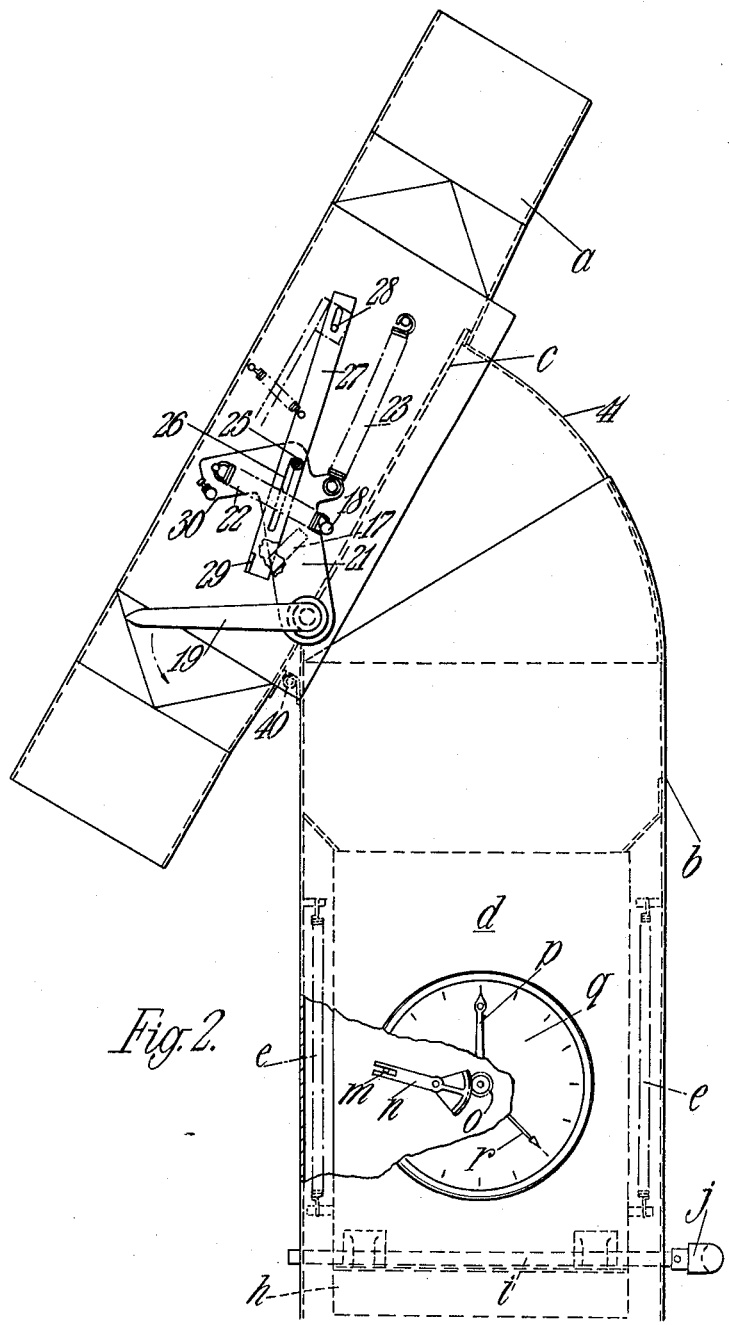
Figure 2 is a view showing the parts of the arrangement actuated by the control handle and also the weighing and discharge mechanism.

The handle 19, Figure 2, is manipulated to determine when the valve c is to move from the position shown in Figures 2 and 5 blocking off the by-pass or branch b to the position shown in Figure 4 when the material descending the spout a is diverted temporarily into the by-pass, but the handle does not directly move the valve. Such handle 19 is upon a short shaft 30 (Figure 6) which has thereon an arm 21 connected by a spring 22 to the pin 18 (see Figures 2, 4 and 5) on the cam plate t. Such spring tends to move the valve c to a position across the spout a so as to divert material into the by-pass b but the valve c cannot be operated by such spring until the catch 15 releases the cam plate t. Also attached to the arm 21 is one end of a spring 23, the other end of which is attached to a fixed part 24 so that the spring 23 always pulls the arm 21 to the Figure 2 position. When the arm 21 is moving in a clockwise direction, it carries with it the pin 18 and the cam plate t and so the valve c which it closes on the by-pass connection. There is a pin 25 projecting from one side of the arm 21 which enters a slot 26 in a bar 27 which at its upper end is connected by a pin and slot 28 to the rod 12 which, as before indicated, has its upward movement under the pull of the calibrated spring 13 regulated by a clockwork escapement at 14. When the arm 21 is in the Figure 2 position, with the valve c cutting off the by-pass, the bar 27 is in its fully raised position and the spring 13 out of action. If the handle 19 moves the arm 21 in an anticlockwise direction with the object of causing the valve c to move to a position opening the connection to the by-pass and closing the through connection to the lower part of the spout a, the bar 27 is pulled downwards and this pulls down the rod 12 and extends the spring 13. When the arm 21 is approaching its final position in an anti-clockwise direction, the adjustable stud 30 on the arm strikes the pad 29 on the lower end of the bar 27 which causes the pin 25 to move out of the laterally extending top portion of the slot 26 into the straight portion, so that the rod 12 is free to move upwards under the pull of the spring 13 and under the control of the escapement mechanism which may be operatively connected to the rod 12 by rack teeth and pinion. The part 17 (which is adjustable in the arm 21) has by now moved into the position shown in Figure 4 so that at the same time as the stud 30 strikes the pad 29 on the bar 27, the part 17 engages the pin 16 on the catch 15 and releases such catch from the cam plate t, so that the spring 22 connected to the pin 18 on the cam plate moves the latter to the position shown in Figure 4 with the cam plate locked by the catch plate w. The valve c upon the spindle s is now fully across the spout a as shown in Figure 4. The rod 12 now commences to move upwards under the pull of the spring 13 and as regulated by the escapement mechanism until the collar 11 on the rod 12 engages the lever 10 which releases the catch plate w from the cam plate t, so that the spring 23 can return the arm 21 to its Figure 4 position, carrying with it through the pin 18 the cam plate t and so the valve c so that the latter is again in the Figure 2 position. Thus operation of the handle 19 in a downward anti-clockwise direction turns the arm 21, draws down the rod 12 and stores up energy in the spring 13, also releasing the catch 15 and causing the spring 22 to move the cam plate t to withdraw the valve c from the opening to the by-pass and to close the through connection. When the rod 12 moves upwards to a predetermined extent, the catch w is released from the cam plate t, and the spring 23 pulling on the arm 21, causes the latter through its engagement with the pin 18 on the cam plate to return the latter to the Figure 5 position with the valve c closing the by-pass connection.

It will be understood from the foregoing that the handle 19 merely determines when the valve c will be operated so that the time taken by the operator to move the handle 19 has no effect on the time during which material is passing through the by-pass. This is automatically determined, after the valve has been moved, by the escapement mechanism and the graduated spring 13.

The complete metering device may form a self-contained unit which can be fitted into a spout inclined at any angle from the vertical to 60° from the vertical whilst at the same time ensuring that the weighing mechanism, which is of the spring type, is vertically mounted. The part of the unit containing the balance is pivotally attached at 40 to the remainder to permit of the relative adjustment of the parts to keep the balance vertical for all angles of spout. There is also a part 41 of the unit with a curved peripheral contour which telescopes into the balance containing part of the unit to allow for angular adjustments of the latter part relatively to the remainder, whilst maintaining the complete unit totally enclosed. When the valve is in its Figure 2 position, it forms part of the spout surface.

If weighments are to be made at regular intervals, the handle 19 can be operated by cam or other mechanism at such regular intervals.

What I claim is:

1. In an apparatus for measuring the weight flow of free flowing material travelling down a spout comprising a by-pass fitting connected to the spout, a valve in said spout for permitting the material to flow down the spout or for diverting and causing it to flow into the by-pass, a scale pan associated with a weight indicator in said by-pass, means for operating the valve comprising a spring for actuating the valve to its material diverting position, a catch retaining the valve in its position permitting flow down the spout, means for loading the spring and releasing the catch to cause the valve to move to its material-diverting position, a catch for retaining the valve in said material diverting position, an escapement means, a part controlled by said escapement means for releasing said last named catch after having moved a predetermined time, and spring means for moving the valve back to its original position when said last named catch is released.

2. In the apparatus as claimed in claim 1, said valve operating means having a spindle carrying the valve, a cam plate on the spindle, said spring loading and catch releasing means including an arm, said spring connecting the arm to the cam plate, a handle for turning the arm to commence a weighing cycle, said spring means adapted to be tensioned by said arm, a calibrated spring, said escapement means including a rod moved by the arm to tension the calibrated spring, and escapement mechanism regulating the return movement of the rod by the calibrated spring, said first named catch retaining the cam plate with the valve in the position permitting flow down the spout, adapted to be released by said arm when approaching its final movement by said handle, the first-mentioned spring then turning the cam plate to move the valve to material diverting position and the arm releasing the rod to allow it to be moved by the calibrated spring, said second-mentioned catch holding the cam plate with the valve in the material diverting position, said part including means actuated by the rod on its return movement to release said last named catch so that the spring means can return the cam plate to the position permitting flow down the spout.

References Cited in the file of this patent
UNITED STATES PATENTS

| | | |
|---|---|---|
| 887,615 | Fenstermaker | May 12, 1908 |
| 1,966,712 | Fisher et al. | July 17, 1934 |
| 2,523,179 | Alvord | Sept. 19, 1950 |

FOREIGN PATENTS

| | | |
|---|---|---|
| 648,382 | Germany | July 30, 1947 |